United States Patent [19]

Ashi

[11] Patent Number: 5,095,943
[45] Date of Patent: Mar. 17, 1992

[54] FLOW PATH SWITCHING APPARATUS IN STEAM TRAP

[75] Inventor: Hatsuo Ashi, Chiba, Japan
[73] Assignee: Fushiman Co., Ltd., Tokyo, Japan
[21] Appl. No.: 649,434
[22] Filed: Feb. 1, 1991
[51] Int. Cl.⁵ .............................................. F16T 1/02
[52] U.S. Cl. ............................ 137/599.2; 137/614.17; 251/317
[58] Field of Search ............ 137/599.2, 269.5, 614.17; 251/317

[56] References Cited

U.S. PATENT DOCUMENTS

| | | | |
|---|---|---|---|
| 3,146,792 | 9/1964 | Donnelly et al. | 137/614.17 |
| 3,497,179 | 2/1970 | Smyers | 251/317 X |
| 3,526,248 | 9/1970 | Billeter | 137/599.2 |
| 3,854,497 | 12/1974 | Rosenberg | 137/269.5 X |
| 3,916,943 | 11/1975 | Hester et al. | 251/317 X |
| 4,187,872 | 2/1980 | Freeman et al. | 137/599.2 X |
| 4,473,088 | 9/1984 | Dotter | 137/614.17 X |
| 4,624,281 | 11/1986 | Vidal et al. | 137/599.2 |

Primary Examiner—Stephen M. Hepperle
Attorney, Agent, or Firm—Blakely Sokoloff Taylor & Zafman

[57] ABSTRACT

A flow path switching apparatus in an automatic regulating valve includes a base having a fluid inlet and a fluid outlet which are connected to pipes, and an automatic regulating valve portion having an inflow hole and an outflow hole for a fluid to be controlled. The automatic regulating valve portion is pivotally mounted on the base. A pair of inflow and outflow communication paths for causing the fluid inlet to communicate with the inflow hole and causing the fluid outlet to communicate with the outflow hole are formed in the automatic regulating valve portion. The fluid inlet is connected to or disconnected from the fluid outlet in accordance with a pivot position of the automatic flow regulating valve portion.

1 Claim, 7 Drawing Sheets

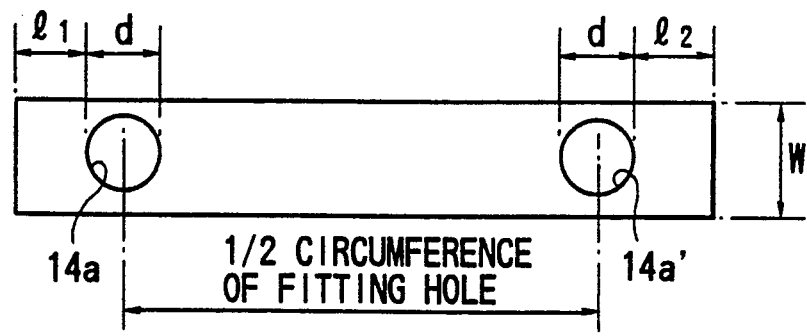
F I G.4
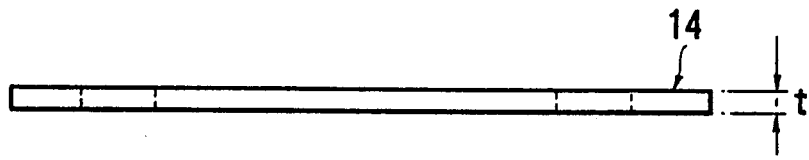
F I G.5
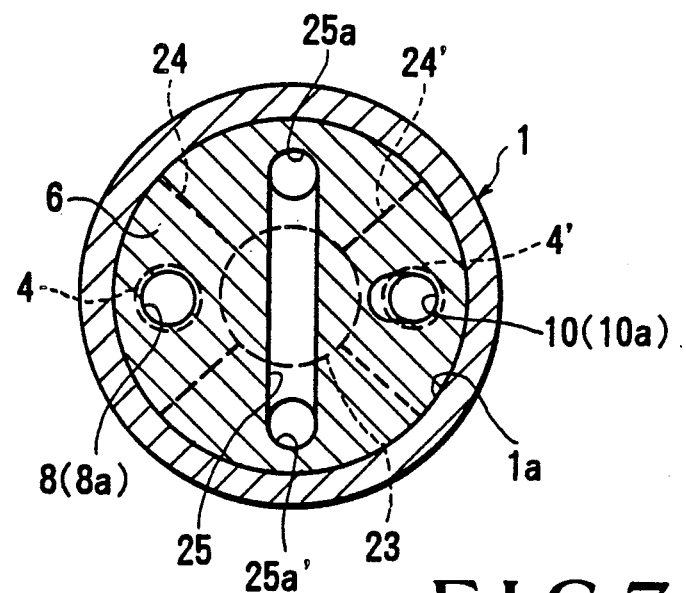
F I G.7

FLOW PATH SWITCHING APPARATUS IN STEAM TRAP

BACKGROUND OF THE INVENTION

The present invention relates to a flow path switching apparatus capable of effectively forming a fluid flow path in an automatic regulating valve such as a steam trap or a pressure reducing valve.

When a steam trap is generally installed in a pipe, as shown in FIG. 11, a pair of stop valves 101 and 102, a strainer 103, and an automatic regulating valve 104 are arranged in a pipe 105. A bypass pipe 108 having a stop valve 107 is connected in parallel with the pipe 105. With this arrangement, the strainer 103 and the automatic regulating valve 104 can be inspected, adjusted, replaced, and the like by the above piping technique. Every time inspection or the like is to be performed, the valves 101, 102, and 107 must be independently controlled, resulting in cumbersome operations. Even if an automatic control valve 110 incorporating a strainer shown in FIG. 12 is used, a piping network can be slightly simplified.

To the contrary, a steam trap apparatus described in Japanese Utility Model Laid-Open No. 63-57897 is effective to simplify the piping network. As shown in FIG. 13, a cylindrical switching valve plug 128 is fitted in a valve cage 120 having a fluid inlet 121 and a fluid outlet 122 which constitute an almost U-shaped flow path. The cylindrical switching valve plug 128 has a pair of valve holes 124 and 125 which can be connected to the fluid inlet 121 and the fluid outlet 122, and a bypass path 126 for causing the fluid inlet 121 and outlet 122 to communicate with each other. A steam trap portion 130 is connected to a portion of the valve cage 120 at a position opposite to the fluid inlet 121 and the fluid outlet 122. Upon pivotal movement of the switching valve plug 128, a flow path communicating with the stream trap portion 130 through the valve holes 124 and 125, a flow path constituted by the bypass path 126, or a state in which the fluid inlet 121 communicates with the fluid outlet 122 is selectively obtained. As a result, the bypass pipe and the stop valve which are required for inspection of the steam trap portion 130 can be omitted, and the resultant piping structure can be simplified, as shown in FIG. 14 (see FIGS. 11 and 12).

In the above steam trap apparatus, a total of four teflon flat packings must be arranged at the connecting portions between the valve holes of the switching valve plug and the fluid inlet and outlet as well as the connecting portions between the valve holes of the switching valve plug and the steam trap portion. In addition, when the valve plug is pivoted to align the valve holes 124 and 125 with the fluid inlet 121 and the like, leakage of the steam into the valve chamber cannot be prevented while the opening ends of the valve holes cross the surfaces of the packings 131, thus requiring a ground packing 132. Leakage is caused by end deformation of the packing itself, and it is difficult to perfectly fit the packing along the inner surface of the valve chamber due to flatness of the packing. As a result, a perfect sealing effect cannot be obtained, thus posing a decisive drawback of the apparatus of this type. As is apparent from FIG. 14, the conventional steam trap apparatus has a so-called U-turn type piping structure. In other words, a linear piping path cannot be formed, and the piping space cannot be effectively reduced. In addition, the switching valve plug portion becomes bulky as compared with the steam trap portion. Furthermore, since the axes of the valve chamber portion and the steam trap portion are different (XX axis and X'X' axis), chucking must be independently performed during machining, thus posing many problems due to a complicated structure. When the automatic regulating valve (A) incorporating the strainer shown in FIG. 12 is used, the position of the strainer is fixed after installation. When the automatic regulating valve is located near a wall of a building or other facilities, it is very difficult to remove the strainer.

SUMMARY OF THE INVENTION

It is an object of the present invention to provide a flow path switching apparatus in an automatic regulating valve, wherein a valve apparatus itself can be connected in a pipe without using a bypass pipe, a strainer, and/or a stop valve, an optimal operation of the valve apparatus can be assured, and a piping space can be reduced.

In order to achieve the above object of the present invention, there is provided a flow path switching apparatus in an automatic regulating valve, comprising a base having a fluid inlet and a fluid outlet which are connected to pipes, and an automatic regulating valve portion having an inflow hole and an outflow hole for a fluid to be controlled, the automatic regulating valve portion being pivotally mounted on the base, wherein a pair of inflow and outflow communication paths for causing the fluid inlet to communicate with the inflow hole and causing the fluid outlet to communicate with the outflow hole are formed in the automatic regulating valve portion, and the fluid inlet is connected to or disconnected from the fluid outlet in accordance with a pivot position of the automatic flow regulating valve portion.

The fluid inlet and the fluid outlet can communicate with each other through the pair of communication paths or can be disconnected from each other in accordance with pivot positions of the automatic regulating valve portion. Therefore, the valve apparatus can be formed upon flow path switching without using stop valves generally located at the inlet and outlet of the automatic regulating valve.

A bypass is formed in the automatic regulating valve portion to cause the fluid inlet and outlet to directly communicate with each other to form a valve apparatus without using a bypass pipe and any stop valve, thereby obtaining various flow states.

A packing which is brought into tight contact with the outer circumferential surface of the valve cage of the automatic valve portion is fitted in a packing groove formed on the inner circumferential surface of a base located at the openings of the fluid inlet and outlet. Leakage of the fluid can be efficiently prevented. In addition, upon pivotal movement of the automatic regulating valve portion, the position of the strainer incorporated in the automatic regulating valve portion can be located on a side (direction) which facilitates attachment/detachment.

BRIEF DESCRIPTION OF THE DRAWINGS

FIGS. 4 and 5 are a plane view and a side view, respectively, showing a modification of the packing shown in FIG. 2 and 3;

FIG. 7 is a sectional view of the apparatus along the line VII—VII of FIG. 6;

DESCRIPTION OF THE PREFERRED EMBODIMENTS

Figure 1:
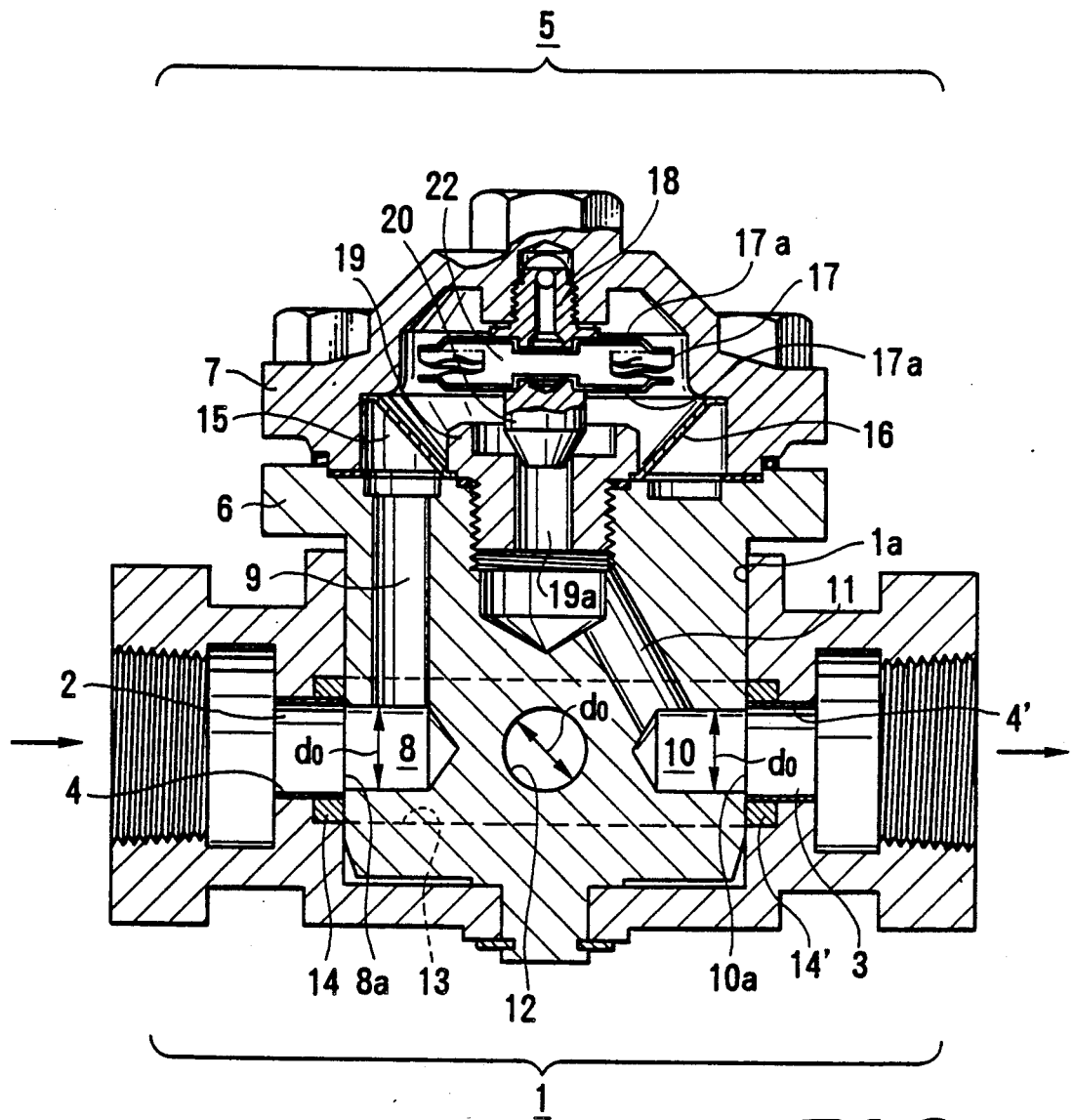
FIG. 1 is a longitudinal sectional view of a steam trap apparatus according to the first embodiment of the present invention.
Figure 2:
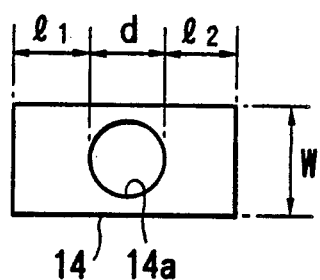
FIGS. 2 and 3 are a plane view and a side view, respectively, of a flow path switching packing of the apparatus shown in FIG. 1.
Figure 3:
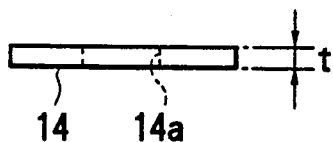

A flow path switching apparatus in an automatic regulating valve according to the first embodiment of the present invention will be described with reference to FIGS. 1 to 5. FIG. 1 shows a steam trap apparatus capable of automatically discharging condensed water from a steam pipe. Reference numeral 1 denotes a base in which a fluid inlet 2 for receiving steam and condensed water and a fluid outlet 3 for discharging the condensed water are formed at opposite positions. Reference numerals 4 and 4' denote packing guide pipes for preventing end deformation of the packings (to be described in detail later) fitted in the fluid inlet 2 and the fluid outlet 3. Reference numeral denotes an automatic regulating valve portion constituting a steam trap portion consisting of a lid 7 and a valve cage 6 pivotally fitted in a fitting hole 1a of the base 1. Reference numeral 8 denotes an inflow communication path for causing an inflow hole 9 and the fluid inlet 2 which are used to supply steam and condensed water to a trap chamber (to be described later) at an illustrated pivot position of the valve cage 6. Reference numeral 10 denotes an outflow communication path for causing the fluid outlet 3 and an outflow hole 11 connected from the valve seat port 19a to communicate with each other. A bypass path 12 extends through the valve cage 6 in a direction perpendicular to a direction for connecting openings 8a and 10a respectively aligned with the fluid inlet 2 and the fluid outlet 3 at a pivot position of the valve cage 6. A packing groove 13 is formed in the entire inner circumferential surface of the fitting hole 1a located at the openings of the fluid inlet 2 and the fluid outlet 3. Distal end portions of packing guide pipes 4 and 4' are fitted into the packing groove 13 under pressure to fit packings 14 and 14' therein. The packings 14 and 14' are made of poly tetrafluoro ethylene resin having flexible and heat-resistant properties, or graphite. When the ethylene tetrafluoride resin is used, stripe- or ribbon-like packings may be used. As shown in FIGS. 2 and 3, a diameter d of the hole 14a to which the packing guide pipes 4 and 4' are to be inserted is slightly smaller than the outer diameter of the packing guide pipe 4 (4'). Lengths 1 and 2 of both end portions of the packing are larger than an inner diameter d0 of the opening 10a and the opening of the bypass path 12. A width w and a thickness t of the packing are slightly larger than the width and depth of the packing groove 13. When the lengths 1 and 2 of the both end portions of the packing are increased, it is effective to prevent its end deformation. However, it is possible to use an integrated one consisting of the packings 14 and 14', as shown in FIGS. 4 and 5.

Reference numeral 15 denotes a trap chamber formed inside the lid 7; 16, a strainer; 17, a welded metal bellows fitted inside the trap chamber 15; 18, a bellows mounting screw welded to an upper bellows metal piece 17a; and 19, a valve seat having the valve seat port 19a. A lower bellows metal piece 17a which carries a valve plug 20 for opening/closing the valve seat port 19a is welded on the welded metal bellows 17. A working fluid (i.e., a volatile fluid whose vapor pressure is changed in accordance with a change in temperature) is sealed in a sealed chamber 22 of the welded metal bellows 17 which is formed around the upper and lower bellows metal pieces 17a.

The flow path switching apparatus in the automatic regulating valve in this embodiment has the above structure. When the automatic regulating valve portion (steam trap portion) 5 is pivoted with respect to the base 1, a flow path between the fluid inlet 2 and the fluid outlet 3 can be freely switched. When the inner valve cage 6 is located at a pivot position shown in FIG. 1, the fluid inlet 2 open to the inner circumferential surface of the fitting hole 1a of the base 1 is aligned with the opening 8a of the inflow communication path 8. At the same time, the fluid outlet 3 is aligned with the opening 10a of the outflow communication path 10. Therefore, the fluid inlet 2 communicates with the fluid outlet 3 through the trap chamber 15. When a temperature of the trap chamber 15 is low, the pressure of the working fluid in the sealed chamber 22 of the welded metal bellows 17 is decreased. As a result, the valve plug 20 is separated from the valve seat 19 to open the valve seat port 19a. Condensed water supplied from the fluid inlet 2 is discharged from the fluid outlet 3 of the valve apparatus through the inflow communication path 8, the inflow hole 9, the trap chamber 15, the valve seat port 19a, the outflow hole 11, and the outflow communication path 10. When steam is supplied to the trap chamber 15 formed in the above flow path to increase the temperature of the trap chamber 15, the pressure of the working fluid in the sealed chamber 22 in the welded metal bellows 17 is increased to close the valve seat port 19a with the valve plug 20 to prevent the steam from flowing out from the fluid outlet 3. In addition, when the condensed water is stored in the trap chamber 15 to decrease its temperature, the pressure of the working fluid in the welded metal bellows 17 is decreased. The valve seat port 19a is opened again to discharge the condensed water from the fluid outlet 3. In this manner, when the fluid inlet 2 can communicate with the fluid outlet 3 through the inflow communication path 8 and the outflow communication path 10, the condensed water is automatically discharged.

When the valve cage 6 is pivoted through 90° clockwise or counterclockwise in the above-mentioned state, the fluid inlet 2 and the fluid outlet 3 are connected to the bypass path 12. On the other hand, the opening 8a of the inflow communication path 8 and the opening 10a of the outflow communication path 10 are kept closed because they are not aligned with the fluid inlet 2 and the fluid outlet 3, respectively. A bypass flow path through the bypass path 12 is formed between the fluid inlet 2 and the fluid outlet 3. In this bypass flow state, since the fluid inlet 2 directly communicates with the fluid outlet 3, it is convenient to discharge a large amount of condensed water at the time of use for a blow-off operation of a new pipe connected to the fluid inlet and outlet or at the time of restart after temporary interruption. It is also possible to continuously discharge the condensed water at the time of disassembly, inspection, repair of the trap portion for a long period of time. Note that since a drain amount in this case is relatively small, a pivot angle of the valve cage 6 is set to fall within the range of 90°±α to appropriately adjust (reduce) the flow path area of the opening of the bypass path 12, thereby forming a flow path corresponding to a required amount of condensed water. Since the steam trap portion is disconnected from the flow path, the strainer 16, the welded metal bellows 17, and the valve seat 19 which are incorporated in the steam trap portion can be maintained, inspected, and adjusted. In this case, these operations can be performed while the condensed water is kept discharged through the bypass flow path.

When the valve cage 6 is pivoted through 45° clockwise or counterclockwise in the state shown in FIG. 1, an intermediate state between the trap communication state and the bypass flow state is obtained. In this case, since the inflow communication path 8, the outflow communication path 10, and the bypass path 12 are not aligned with the fluid inlet 2 and the fluid outlet 3 and are kept closed. The fluid naturally does not flow from the fluid inlet 2 to the automatic regulating valve portion (steam trap portion) 5. In this case, the strainer 16, the welded metal bellows 17, and the like can be maintained or inspected.

As described above, the flow state can be changed in accordance with different pivot positions of the automatic regulating valve portion 5. In this case, when the valve cage 6 is pivoted in the state shown in FIG. 1, the opening 8a of the inflow communication path 8 is gradually released from a state of matching with the opening of the fluid inlet 2 and gradually crosses the surface of the packing 14. In this case, the packing 14 is in tight contact with the packing groove 13 without any gap therebetween, and is mounted on the inner circumferential surface of the fitting hole 1a by the outer circumferential surface of the valve cage 6. The packing 14 is kept in tight contact with the outer circumferential surface of the valve cage 6 while the valve cage 6 is being pivoted. Steam or the like does not leak from the fluid inlet 2 or the inflow communication path 8 to a portion between the inner circumferential surface of the fitting hole 1a and the outer circumferential surface of the valve cage 6, thereby perfectly obtaining an air-tight (liquid-tight) state. This sealing state is similarly obtained by the packing 14'. Therefore, the perfect sealing effect can be obtained at the respective pivot positions of the automatic regulating valve portion 5 during or after flow path switching.

Figure 13:
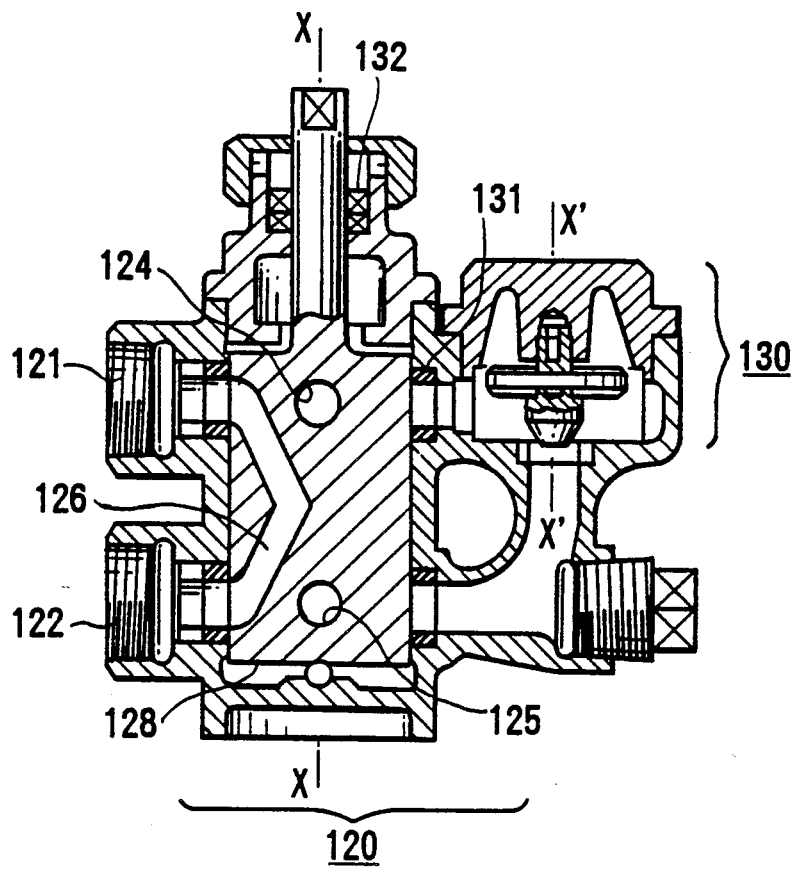
FIG. 13 is a longitudinal sectional view of a conventional steam trap apparatus whose flow path can be switched.
Figure 14:
FIG. 14 is a view showing a piping arrangement of the steam trap apparatus shown in FIG. 13.

The flow path state can be effectively switched by a simple operation, i.e., pivotal movement of the automatic regulating valve portion 5. When the valve apparatus is to be installed in a pipe in practice, stop valves and a bypass pipe need not be used, thus facilitating handling with a simple structure. The conventional so-called U-turn type piping network described with reference to the conventional steam trap apparatus need not be used. Pipes are connected to the fluid inlet 2 and the fluid outlet 3 to obtain a linear pipeline. In addition, since the automatic regulating valve portion 5 is fitted on the base 1, the piping space can be reduced. Naturally, it is easy to form a linear flow path pipeline on the construction site. In this case, the fluid inlet 2 and the fluid outlet 3 can be connected to pipes through flanges or by welding, thereby improving installation efficiency and hence greatly reducing piping cost. As compared with the conventional valve apparatus (steam trap apparatus) shown in FIG. 13, only two packing seal portions (i.e., portions of the packings 14 and 14'), the number of which is ½ that of the conventional packings, can provide a perfect sealing effect. In addition, since a separate switching valve need not be arranged, the valve apparatus can be made compact and lightweight. In addition, only one axis is required during machining, thus facilitating machining and hence reducing the manufacturing cost of the valve apparatus. Since the valve apparatus is simple, compact, and lightweight at low cost, the diameter of each path constituting a flow path, and the diameter or capacity of the welded metal bellows 17 can be increased. Therefore, a large-capacity steam trap apparatus can be manufactured.

Figure 6:
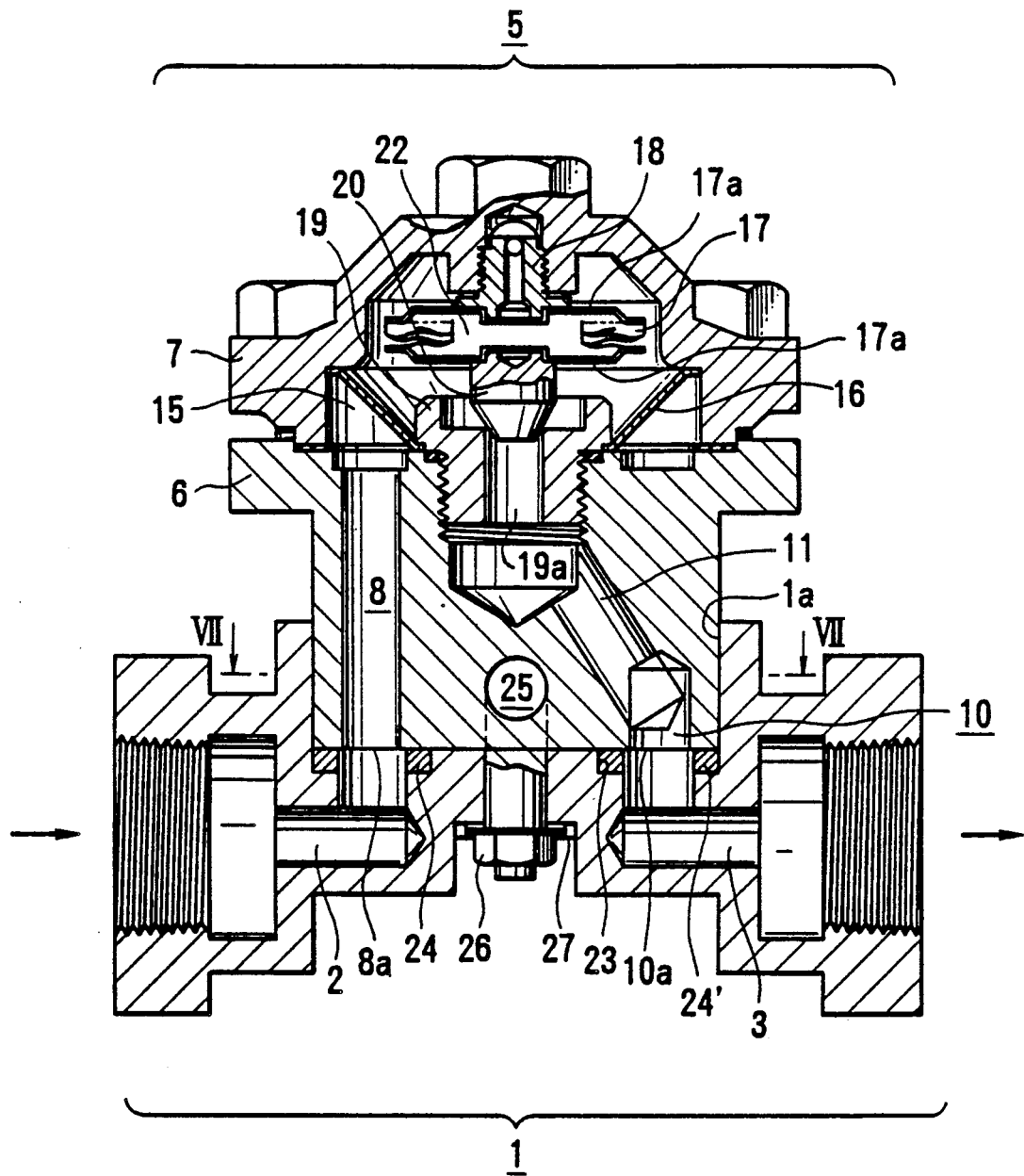
FIG. 6 is a longitudinal sectional view of a steam trap apparatus according to the second embodiment of the present invention.

FIGS. 6 and 7 show a flow path switching apparatus in an automatic regulating valve according to the second embodiment of the present invention. This embodiment exemplifies a steam trap apparatus as in the first embodiment. A fluid inlet 2 and a fluid outlet 3 are open at opposite positions on a single circumference on the bottom of a fitting hole 1a. A packing groove 23 is formed along this circumference. The packing groove 23 has a predetermined width, a predetermined depth, and both end portions each having a predetermined length. Distal end portions of packing guide pipes 4 and 4' are inserted into the packing groove 23 to mount packings 24 and 24'. On the other hand, an opening 8a of an inflow communication path 8 and an opening 10a of an outflow communication path 10 are formed in the lower end face of a valve cage 6 mounted on a base 1 so as to match with the openings of the fluid inlet 2 and the fluid outlet 3. A bypass path 25 is formed inside the valve cage 6. The bypass path 25 has openings 25a and 25a' formed at radial positions perpendicular to the direction of the opening 8a and 10a on a single circumference. The thickness of each of the sector-shaped packings 24 and 24' (these packings may comprise C-shaped or disc packings) is slightly larger than the depth of the packing groove 23. A nut 26 is tightened through a coned disc spring 27 to mount the automatic regulating valve portion (steam trap portion) on the base 1, so that the packings 24 and 24' are brought into tight contact with the valve cage 6. Note that an inflow hole is integrally formed with the inflow communication path 8 in FIG. 6.

In the second embodiment, when the automatic regulating valve portion 5 is located at a pivot position shown in FIG. 6, the fluid inlet 2 can communicate with the fluid outlet 3 through the inflow communication path 8 and the outflow communication path 10. When the valve cage 6 is pivoted through 90° clockwise or counterclockwise in this state, the opening 25a and an opening 25a' of the bypass path 25 are aligned with the opening of the fluid inlet 2 or the opening of the fluid outlet 3, thereby forming a bypass flow path through the bypass path 25. At an intermediate position between these pivot positions, the fluid inlet 2 and the fluid outlet 3 are disconnected from each other. The flow path can be changed in accordance with the pivot positions of the automatic regulating valve portion 5, thereby obtaining the same effect as in the first embodiment.

Figure 8:
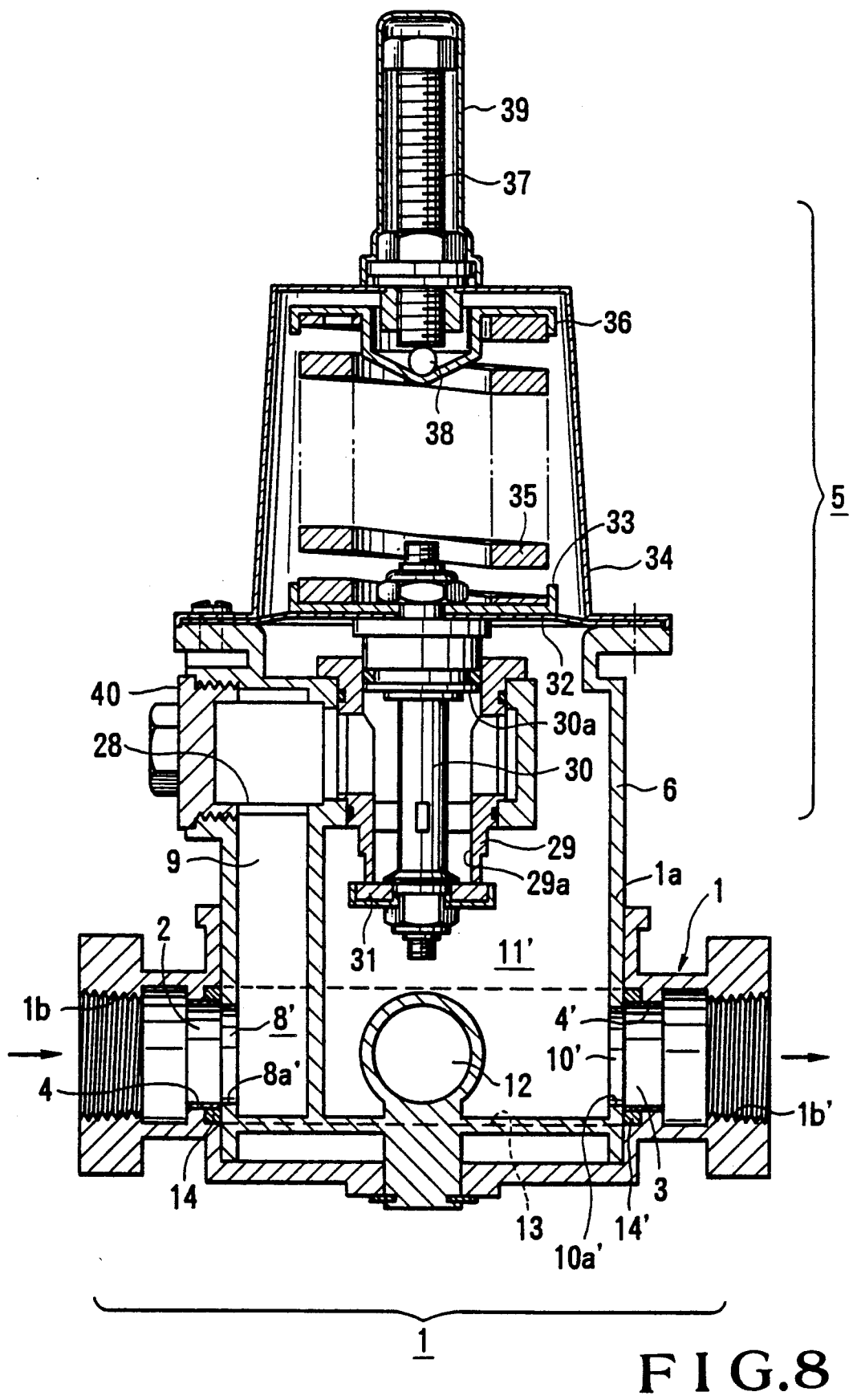
FIG. 8 is a longitudinal sectional view of a pressure reducing valve apparatus according to the third embodiment of the present invention.

FIG. 8 shows a flow path switching apparatus in an automatic regulating valve according to the third embodiment of the present invention. The third embodiment exemplifies a pressure reducing valve apparatus. The same reference numerals as in the first embodiment denote the same parts in the third embodiment. When a valve cage 6 is pivoted through 90° clockwise or counterclockwise from a pivot position (FIG. 8) where an opening 8a' of an inflow communication path 8' of the valve cage 6 pivotally fitted on a base 1 is aligned with a fluid inlet 2, and an opening 10a' of an outflow communication path 10' is aligned with a fluid outlet 3, a bypass path 12 which extends through the valve cage 6 causes the fluid inlet 2 and the fluid outlet 3 to communicate with each other. Reference numeral 28 denotes a strainer; 29, a valve seat; 30, a valve stem slidably fitted in a liner of the valve seat 29; 31, a valve plug fixed at the distal end of the valve stem 30 to open/close a valve seat port 29a; 32, a diaphragm extending from the outer circumferential surface portion of the upper end of the valve cage 6 and fixed to the upper portion of the valve stem 30; 33, a diaphragm retainer; 34, a spring case; 35, an adjusting spring mounted in the spring case 34 to push the diaphragm retainer 33; 36, a spring retainer; 37, an adjusting screw for supporting the spring retainer 36 through a ball 38 to adjust an elastic force of the adjusting spring 35; and 39, a rubber cap.

In the pressure reducing valve apparatus according to the third embodiment of the present invention, when the valve cage 6, i.e., the automatic regulating valve portion (pressure reducing valve portion) 5 is located at a pivot position shown in FIG. 8, a fluid (primary fluid) flowing in the fluid inlet 2 reaches a valve seat port 29a trough the inflow communication path 8', the inflow hole 9, and the stainer 28. The pressure of the primary fluid serves as an upward force acting on a piston 30a of the valve stem 30. This force is balanced with a downward force acting on the valve plug 31, and the pressure of the primary fluid does not adversely affect a pressure of a secondary fluid (i.e, a fluid at the outflow hole 11'). The pressure of the secondary fluid serves as an upward force acting on the diaphragm 32 in a non-load state (zero flow rate) and is balanced with a downward elastic force of the adjusting spring 35. In this case, since the valve plug 31 is brought into tight contact with the lower end contact surface of valve seat 29, the valve seat port 29a is closed, and the primary fluid cannot flow into the secondary side. When a load increases in this state (i.e., a fluid flows to cause a decrease in pressure of the secondary fluid, so that the valve plug 31 is open), the pressure of the secondary fluid is decreased in accordance with a magnitude of the load (flow rate). The valve plug 31 is operated to balance the pressure of the secondary fluid with the elastic force of the adjusting spring 35, thereby adjusting the degree of opening of the valve seat port 29a. Therefore, the pressure of the secondary fluid is kept at a predetermined value. The fluid flowing in the outflow hole 11' through the valve seat port 29a serves as the secondary fluid which then flows out from the fluid outlet 3. In this case, the fluid inlet 2 communicates with the fluid outlet 3 through the inflow communication path 8' and the outflow communication path 10'. Therefore, this valve apparatus serves as a conventional pressure reducing valve apparatus.

When the valve cage 6 is pivoted through 90° clockwise or counterclockwise in the state shown in FIG. 8, the fluid inlet 2 communicates with the fluid outlet 3 through the bypass path 12, thereby forming a bypass flow path. At an intermediate position between the above pivot positions, the fluid inlet 2 is kept disconnected from the fluid outlet 3. When this state is changed to the bypass flow path state or the disconnected state, a foreign substance left in the strainer 28 is removed or cleaning of the strainer 28 itself can be easily performed. In particular, it is very convenient to easily remove the strainer 28 from the valve apparatus, thereby facilitating the maintenance and inspection. More specifically, in a conventional valve apparatus, once the valve apparatus is installed in a pipe, the position of the strainer is predetermined. The strainer may often be installed toward a wall of a building. In this case, the working space is greatly limited to make it very difficult to mount or remove the strainer. To the contrary, in the pressure reducing valve apparatus of this embodiment, since the automatic regulating valve portion 5 can be moved from the communication pivot position (FIG. 8) to any optimal pivot position which facilitates maintenance or inspection. A strainer chamber lid 40 is removed to easily mount or remove the strainer 28 regardless of the mounting orientation of the pressure reducing valve apparatus of this embodiment. In addition, the base 1 can be connected to pipes through thread portions 1b and 1b', as shown in FIG. 8. Even if these connections are performed by using flanges at the openings of the fluid inlet 2 and the fluid outlet 3, the automatic regulating valve portion 5 is appropriately pivoted to perform operations without being interfered with the bulky flanges.

Figure 9:
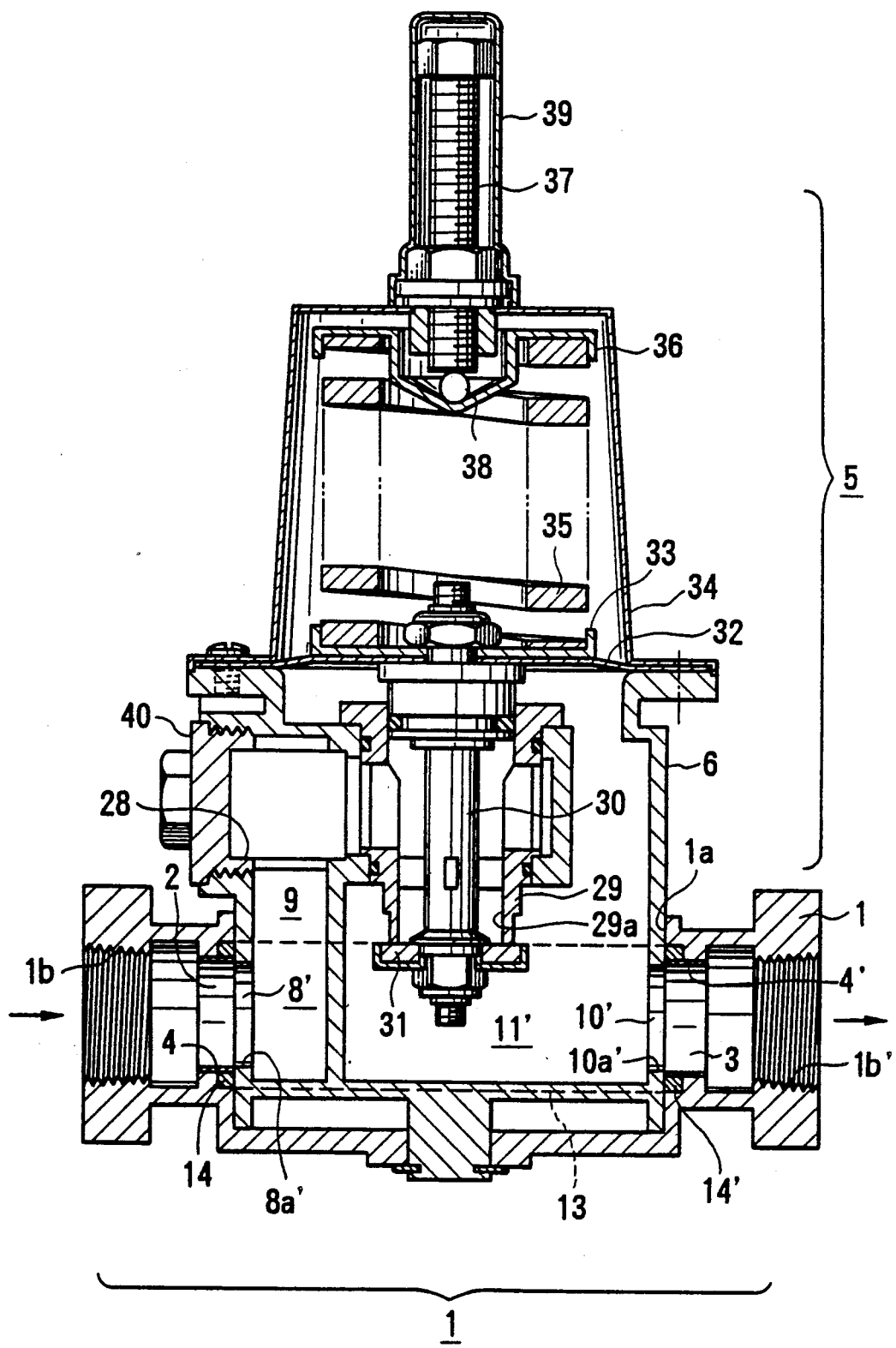
FIGS. 9 and 10 are a longitudinal sectional view showing a modification of a pressure reducing valve apparatus according to the third embodiment of the present invention, and a view showing a piping arrangement, respectively.
Figure 10:
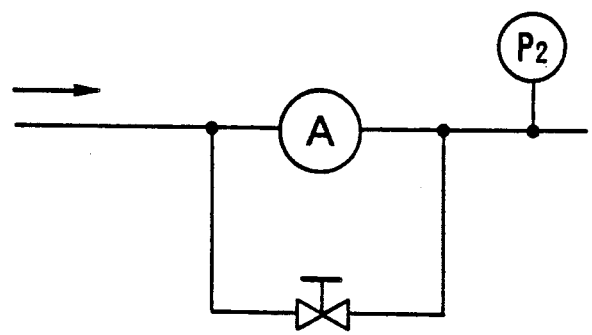
Figure 11:
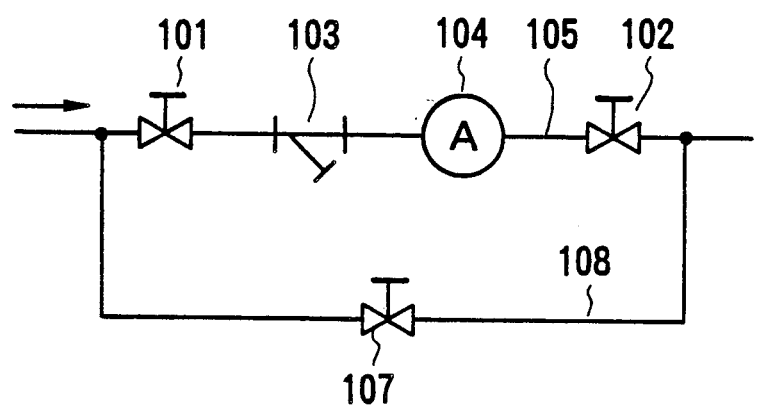
FIGS. 11 and 12 are views showing piping arrangements of conventional automatic valve apparatuses, respectively.
Figure 12:
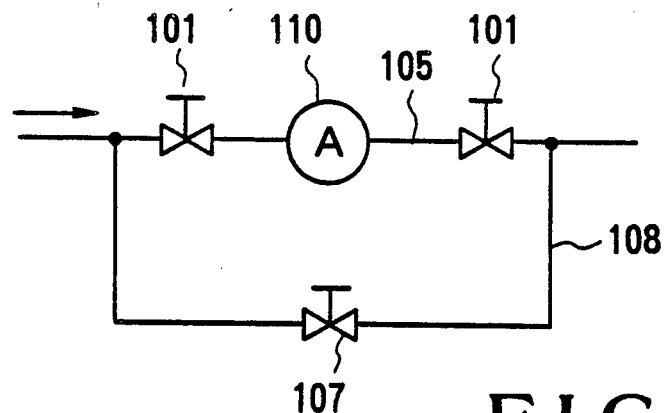

FIG. 9 shows a modification of the third embodiment. As is apparent from FIG. 9, the arrangement is substantially the same as that of the third embodiment, except that a bypass path 12 is not formed. In a pressure reducing valve apparatus of this type, a flow path is often changed to a bypass flow path without changing a state (flow rate) of the fluid of the piping system (this change includes disconnection). In this case, a stop valve is arranged midway along a bypass pipe. Therefore, a bypass flow path need not be formed inside the pressure reducing valve apparatus, and the pressure reducing valve apparatus must have only a stop valve function. Operation procedures for changing a flow path to the bypass pipe in the pressure reducing valve apparatus shown in FIG. 9 will be described with reference to FIG. 10. The automatic regulating valve portion (pressure reducing valve portion]5 of the pressure reducing valve (apparatus) (A) is pivoted clockwise or counterclockwise from a communication state shown in FIG. 9. A bypass stop valve is gradually opened, while the flow rate of the fluid supplied to the fluid inlet 2 (and the fluid outlet 3) is gradually reduced. By reading a value of a secondary pressure gauge (P2), this operation is performed not to cause an abrupt change in pressure and continues until the pressure reducing valve (apparatus) is closed. At this time, the degree of opening of the bypass flow path stop valve is set as a predetermined value, and a shift to the bypass flow path is completed. As described above, when the flow cannot be even temporarily interrupted, or a flow rate cannot be changed, the bypass pipe and its stop valve are required, as shown in FIG. 10. The structure of the automatic regulating valve portion (pressure reducing valve portion) 5 itself can be advantageously simplified by an extent corresponding to the absence of the bypass path.

In each embodiment described above, the steam trap apparatus may be of a capsule type, a bimetal type, a disc type, or a bucket type in place of a bellows type. The present invention is also applicable to a self-operated regulating valve (e.g., a back pressure valve or a pressure difference valve]and a power-assisted control valve (e.g., a solenoid valve or a diaphragm control valve). In addition, the packings 14 and 14' need not be mounted in the base 1, but may be mounted in the valve cage 6. The shapes, materials, and the like of the above members are not limited to those in the above embodiments. It is possible to mount an O-ring along the outer circumferential surface of the valve cage 6.

According to the present invention, as has been described above, a single automatic regulating valve apparatus such as a steam trap apparatus or a pressure reducing valve apparatus can disconnect the flow path or switch the flow path to a bypass flow path. Stop valves and a strainer before and after the automatic regulating valve, and a bypass pipe and its stop valve can be omitted to reduce the piping space and simplify the piping arrangement. The piping work can be simplified at low cost. In addition, a linear pipeline can be easily realized to improve convenience. The connecting portions between the pipes and the fluid inlet and outlet can be formed through flanges or by welding. The number of packing mounting positions at the flow path switching portions can be reduced into ½, and a unique packing sealing structure is obtained to reduce a failure rate and eliminate leakage. Furthermore, the strainer incorporated in the automatic regulating valve portion can be easily mounted or removed upon pivotal movement of the regulating valve portion, so that the valve apparatus can be installed at a convenient position. Furthermore, independent switching valves can be omitted to simplify the structure. Therefore, a compact, lightweight, low-cost valve apparatus can be advantageously provided.

What is claimed is:

1. A flow path switching apparatus comprising a base having a fluid inlet and a fluid outlet which are connected to piping, and a steam trap having a cylindrical cage which has an inflow hole and an outflow hole for condensed water and which is pivotally fitted in the base, wherein flat packings each having a thickness larger than a depth of each of packing fitting grooves formed in said base are respectively fitted in said packing fitting grooves to clamp said packings between said steam trap cage and said base by a spring, an inflow communication path and an outflow communication path are formed in said steam trap cage to cause said fluid inlet and said inflow hole to communicate with each other and to cause said fluid outlet and said outflow hole to communicate with each other, wherein said fluid inlet is set to communicate or not to communicate with said fluid outlet in accordance with a pivot position of said steam trap, and a bypass path for causing said fluid inlet to directly communicate with said fluid outlet is formed.

* * * * *

UNITED STATES PATENT AND TRADEMARK OFFICE
CERTIFICATE OF CORRECTION

PATENT NO. : 5,095,943
DATED : March 17, 1992
INVENTOR(S) : Ashi

It is certified that error appears in the above-identified patent and that said Letters Patent is hereby corrected as shown below:

In column 3 at line 43 after "numeral" insert --5--;

In column 8 at line 53 change "portion]5" to --portion) 5--;

In column 9 at line 9 change "valve]and" to --valve) and--.

Signed and Sealed this

Fifth Day of September, 1995

Attest:

BRUCE LEHMAN

*Attesting Officer*     *Commissioner of Patents and Trademarks*